(12) United States Patent
Santapuri et al.

(10) Patent No.: US 12,326,163 B2
(45) Date of Patent: Jun. 10, 2025

(54) PIN AND GROMMET FASTENER INCLUDING PIN AND GROMMET HAVING PANEL RETENTION FINGERS AND PIN RETENTION FINGERS THAT COOPERATE WITH ONE ANOTHER TO DEFINE PIN RECEPTACLE FOR RECEIVING THE PIN

(71) Applicant: Newfrey LLC, New Britain, CT (US)

(72) Inventors: Kranthi Santapuri, Troy, MI (US); Tien T. Diep, West Bloomfield Township, MI (US); Oday Amer Safry, Farmington Hills, MI (US); Naga Battini, Troy, MI (US)

(73) Assignee: Newfrey LLC, New Britain, CT (US)

( * ) Notice: Subject to any disclaimer, the term of this patent is extended or adjusted under 35 U.S.C. 154(b) by 280 days.

(21) Appl. No.: 17/939,103

(22) Filed: Sep. 7, 2022

(65) Prior Publication Data

US 2024/0077099 A1 Mar. 7, 2024

(51) Int. Cl.
*F16B 19/10* (2006.01)

(52) U.S. Cl.
CPC .............................. *F16B 19/1081* (2013.01)

(58) Field of Classification Search
CPC .................................................. F16B 19/1081
USPC ........................................................ 411/45
See application file for complete search history.

(56) References Cited

U.S. PATENT DOCUMENTS

| | | | |
|---|---|---|---|
| 3,366,000 A * | 1/1968 | Bennett | F16B 19/1081 411/41 |
| 4,952,106 A | 8/1990 | Kubogochi et al. | |
| 5,201,623 A | 4/1993 | Benedetti et al. | |
| 5,507,545 A * | 4/1996 | Krysiak | F16B 19/1081 24/453 |
| 6,196,756 B1 * | 3/2001 | Leverger | B60J 3/023 411/48 |
| 6,428,089 B1 * | 8/2002 | Noda | B60N 3/023 296/214 |

(Continued)

FOREIGN PATENT DOCUMENTS

| | | |
|---|---|---|
| DE | 202012002687 U1 | 6/2013 |
| WO | WO-2012/049811 A1 | 4/2012 |
| WO | WO-2016/043151 A1 | 3/2016 |

OTHER PUBLICATIONS

International Search Report & Written Opinion datd Jan. 4, 2024.

*Primary Examiner* — Flemming Saether
(74) *Attorney, Agent, or Firm* — Harness, Dickey & Pierce, P.L.C.

(57) ABSTRACT

A pin and grommet fastener includes a grommet and a pin. The grommet includes a base, panel locking fingers, and pin locking fingers. The locking fingers project from the base and cooperate with one another to define a pin receptacle therebetween. The pin includes a pin head, a driving beam connected to the pin head, and protrusions. When the pin head is inserted through an opening in the base and into the pin receptacle, the pin locking fingers engage the pin and thereby retain the pin head in the pin receptable. When the fastener is inserted in one direction into a hole in a panel, the panel engages the driving beam and thereby moves the pin relative to the grommet in the opposite direction, which causes the panel locking fingers to flex away from one another and thereby inhibits withdrawal of the fastener from the hole in the panel.

20 Claims, 12 Drawing Sheets

(56) References Cited

U.S. PATENT DOCUMENTS

| | | | |
|---|---|---|---|
| 6,652,206 B2* | 11/2003 | Heflin | F16B 19/1081 |
| | | | 411/908 |
| 6,769,849 B2 | 8/2004 | Yoneoka | |
| 7,249,922 B2 | 7/2007 | Yoneoka | |
| 8,591,160 B2 | 11/2013 | Shinozaki | |
| 8,627,553 B2* | 1/2014 | Kuhm | F16B 2/20 |
| | | | 24/297 |
| 8,882,421 B2 | 11/2014 | Sasaki | |
| 8,926,244 B2 | 1/2015 | Sasaki | |
| 9,016,993 B2 | 4/2015 | Watanabe et al. | |
| 9,103,363 B2 | 8/2015 | Fujiwara | |
| 9,528,540 B2 | 12/2016 | Jamil et al. | |
| 10,202,084 B2* | 2/2019 | H?bner | B60R 13/0206 |
| 10,900,513 B2 | 1/2021 | Diep et al. | |
| 11,933,337 B2* | 3/2024 | Sawano | F16B 19/1081 |
| 2005/0152764 A1* | 7/2005 | Jackson, Jr. | F16B 21/073 |
| | | | 411/45 |
| 2008/0193250 A1* | 8/2008 | Boubtane | F16B 13/025 |
| | | | 411/48 |
| 2014/0050548 A1* | 2/2014 | Loewe | F16B 5/0657 |
| | | | 411/48 |
| 2017/0072629 A1 | 3/2017 | Reznar | |
| 2020/0217345 A1 | 7/2020 | Liebelt | |
| 2020/0318673 A1 | 10/2020 | Diep et al. | |

* cited by examiner

PIN AND GROMMET FASTENER INCLUDING PIN AND GROMMET HAVING PANEL RETENTION FINGERS AND PIN RETENTION FINGERS THAT COOPERATE WITH ONE ANOTHER TO DEFINE PIN RECEPTACLE FOR RECEIVING THE PIN

FIELD

The present disclosure relates to pin and grommet fasteners including a pin and a grommet having panel retention fingers and pin retention fingers that cooperate with one another to define a pin receptable for receiving the pin.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Pin and grommet fasteners are commonly used in the automotive industry. Use of a pin and grommet fastener typically requires insertion of the grommet into an aperture of a joining part. The pin typically must additionally be both inserted into an aperture of the grommet and seated within the grommet aperture. Seating the pin within the grommet causes legs of the grommet to expand radially outward and lock the pin and grommet to the joining part. Thus, in known grommet and pin fasteners, the pin typically must be seated within the grommet as a separate step or operation that must be done after the grommet is inserted into the aperture of the joining part.

In some cases, the pin can be assembled to the grommet with the pin retained in a partial, temporary, or shipping position within the grommet. The pin and grommet fastener can then be shipped to a manufacturing plant. Thus, the end user need only handle a single assembly, and does not need to manage separate pin and grommet components. Such an assembly eliminates the need for the end user to initially insert the pin into the aperture of the grommet. Nevertheless, the pin and grommet fastener typically must still be inserted into the aperture of the joining part, and the pin must still be seated within the grommet as a separate step or operation that typically must be done after the pin and grommet fastener is inserted into the aperture of the joining part.

SUMMARY

A pin and grommet fastener according to the present disclosure is configured to be secured to within a hole in a panel. The pin and grommet fastener includes a grommet and a pin. In one example, the grommet includes a base having an opening, a pair of panel locking fingers projecting from the base adjacent to the opening, and a pair of pin locking fingers projecting from the base adjacent to the opening. The panel and pin locking fingers cooperate with one another to define a pin receptacle therebetween. The pin includes a pin head, a driving beam connected to the pin head, and a pair of protrusions. When the pin head is inserted through the opening in the base of the grommet and into the pin receptacle of the grommet, the pin locking fingers engage the pin and thereby retain the pin head in the pin receptable. When the panel locking fingers, the pin locking fingers, and the pin head are inserted in a first direction into the hole in the panel, the panel engages the driving beam and thereby moves the pin relative to the grommet in a second direction opposite of the first direction. This causes the protrusions on the pin to engage the panel locking fingers and thereby force the panel locking fingers to flex away from one another and inhibit withdrawal of the fastener from the hole in the panel.

In one aspect, the opening in the base of the grommet is elongated, the panel locking fingers are spaced apart from one another along a width of the opening, and the pin locking fingers are spaced apart from one another along a length of the opening.

In one aspect, when the protrusions on the pin engage the panel locking fingers and thereby force the panel locking fingers to flex apart, the pin locking fingers engage the pin head and thereby hold the pin in a position in which the protrusions keep forcing the panel locking fingers to flex apart.

In one aspect, the pin further includes a pin shaft connecting the pin head to the driving beam, and the protrusions on the pin are knuckles that project from the pin shaft.

In one aspect, the pin further includes a pin collar that projects from the pin shaft and cooperates with the pin head to define a pair of locking grooves, and the pin locking fingers include a pair of protrusions configured to engage the locking grooves on the pin to retain the pin head in the pin receptacle.

In one aspect, when the pin is inserted into the pin receptacle of the grommet, and the pin head and the pin collar are moved past the protrusions on the pin locking fingers, the protrusions on the pin locking fingers engage the pin shaft and thereby retain the pin head in the pin receptacle.

In one aspect, side surfaces of the pin head define a guide groove, and the pin locking fingers include a boss that engages the guide groove when the pin head is within the pin receptacle such that, when the pin moves relative to the grommet in the second direction due to the engagement between the driving beam and the panel, the engagement between the boss and the guide groove causes the pin head to rotate about its axis relative to the driving beam.

In one aspect, the protrusions project from the side surfaces of the pin head and engage side surfaces of the panel locking fingers, and thereby cause the panel locking fingers to flex apart, when the pin head rotates due to movement of the pin in the second direction and the engagement between the boss and the guide groove.

In one aspect, when the pin head is inserted into the pin receptacle and the protrusions on the pin head are moved past the pin locking fingers, axial end surfaces of the pin locking fingers engage the protrusions and thereby inhibit withdrawal of the pin head from the pin receptacle.

In one aspect, the panel locking fingers define locking grooves and the protrusions on the pin head engage the locking grooves in the panel locking fingers when the pin head has been rotated by a first amount, the engagement between the protrusions and the locking grooves preventing the pin head from rotating and thereby locking the pin head in position relative to the grommet.

In one aspect, the locking grooves are defined in a first side surface of the pin locking fingers, the panel locking fingers further include an overhang that projects from a second side surface thereof opposite of the first side surface and, when the panel locking fingers are inserted through the hole in the panel, the overhang on the panel locking fingers engages a backside of the panel and thereby further inhibits withdrawal of the fastener from the hole in the panel.

In one aspect, the pin and grommet fastener further includes a tether that connects the pin head to the driving beam while allowing the pin head to rotate about its axis.

In one aspect, the pin and grommet fastener further includes a tubular body having an outer radial surface from which the driving beam projects, and the pin further includes a pin shaft projecting from the pin head and configured to be secured within the tubular body through a snap fit to connect the pin head to the driving beam.

In one aspect, the pin shaft has legs projecting from an axial end thereof, the legs have side surfaces that define grooves therein, the tubular body has an annular flange projecting radially outward therefrom, the annular flange engages the grooves in the legs and thereby secures the pin shaft to the tubular body when the pin shaft is inserted into the tubular body.

In another example, the grommet includes a base having an opening, a pair of panel locking fingers projecting from the base adjacent to the opening, and a pair of pin locking fingers projecting from the base adjacent to the opening. The panel and pin locking fingers cooperate with one another to define a pin receptacle therebetween. The pin locking fingers including protrusions that project toward one another. The pin includes a pin head, a driving beam, a pin shaft connecting the pin head to the driving beam, knuckles projecting from opposite side surfaces of the pin shaft, and a pin collar projecting from opposite side surfaces of the pin shaft and cooperating with the pin head to define a pair of locking grooves. When the pin head and the pin shaft are inserted through the opening in the base of the grommet and into the pin receptacle of the grommet, the protrusions on the pin locking fingers engage the pin shaft and thereby retain the pin head in the pin receptable. When the panel locking fingers, the pin locking fingers, and the pin head are inserted in a first direction into the hole in the panel, the panel engages the driving beam and thereby moves the pin relative to the grommet in a second direction opposite of the first direction. This causes the knuckles on the pin shaft to engage the panel locking fingers and thereby forces the panel locking fingers to flex away from one another. When the pin collar is moved in the second direction past the protrusions on the pin locking fingers, the protrusions engage the locking grooves in the pin and thereby hold the pin in a position in which the knuckles keep forcing the panel locking fingers to flex apart, which inhibits withdrawal of the fastener from the hole in the panel.

In one aspect, the opening in the base of the grommet is elongated, the panel locking fingers are spaced apart from one another along a width of the opening, the pin locking fingers are spaced apart from one another along a length of the opening, and the side surfaces of the pin shaft from which the knuckles project are perpendicular to the side surfaces of the pin shaft from which the pin collar projects.

In one aspect, the grommet further includes a seal projecting from the base, surrounding the panel and pin locking fingers, and configured to press against the panel when the panel locking fingers, the pin locking fingers, and the pin head are inserted into the hole in the panel and the protrusions on the pin locking fingers engage the locking grooves in the pin.

In yet another example, the grommet includes a base, a pair of panel locking fingers projecting from the base, and a pair of pin locking fingers projecting from the base. The panel and pin locking fingers cooperate with one another to define a pin receptacle therebetween. The panel locking fingers having side surfaces that define locking grooves therein. The pin locking fingers including a boss that projects from a side surface thereof. The pin includes a pin head and a driving beam connected to the pin head. The pin head includes protrusions that project from side surfaces thereof. The side surfaces of the pin head define a guide groove. When the pin head is inserted into the pin receptacle of the grommet such that the protrusions on the pin head are moved past the pin locking fingers, axial end surfaces of the pin locking fingers engage the protrusions and thereby inhibit withdrawal of the pin head from the pin receptacle. When the panel locking fingers, the pin locking fingers, and the pin head are inserted in a first direction into the hole in the panel, the panel engages the driving beam and thereby moves the pin relative to the grommet in a second direction opposite of the first direction and, in turn, the engagement between the boss and the guide groove causes the pin head to rotate about its axis relative to the driving beam. This causes the protrusions on the pin head to engage the panel locking fingers and thereby force the panel locking fingers to flex away from one another. When the pin head has rotated by a first amount, the protrusions engage the locking grooves, which prevents the pin head from rotating and thereby locks the pin head in position relative to the grommet and inhibits withdrawal of the fastener from the hole in the panel.

In one aspect, the pin and grommet fastener further includes a tether that connects the pin head to the driving beam while allowing the pin head to rotate about its axis. The pin head, the driving beam, and the tether form a single continuous piece.

In one aspect, the pin and grommet fastener further includes a tubular body having an outer radial surface from which the driving beam projects and an axial end that is curved radially inward, and the pin further includes a pin shaft projecting from the pin head, the pin shaft having legs projecting from an axial end thereof. The legs have side surfaces that define grooves therein. The axial end of the tubular body engages the grooves in the legs and thereby secures the pin shaft to the tubular body when the pin shaft is inserted into the tubular body.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
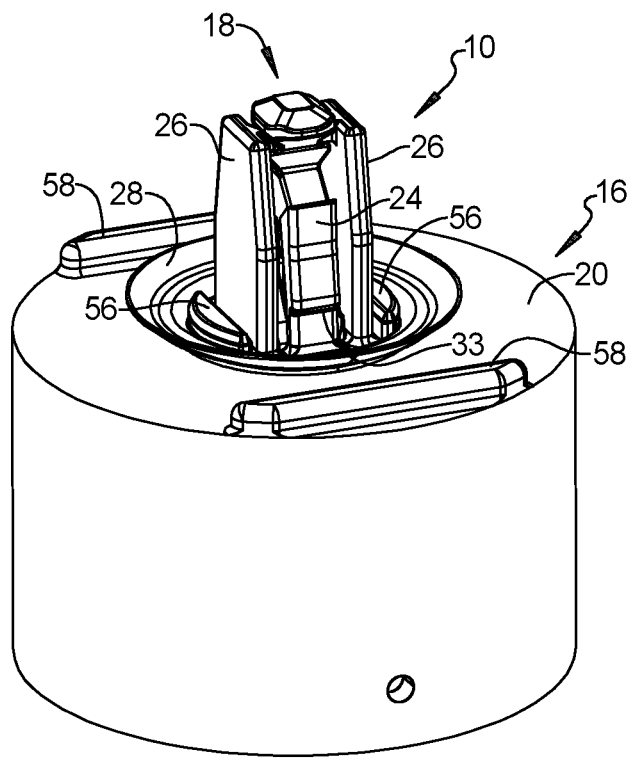
FIG. 1 is a perspective view of an example of a pin and grommet fastener according to the present disclosure, the fastener including a pin and a grommet.
Figure 4:
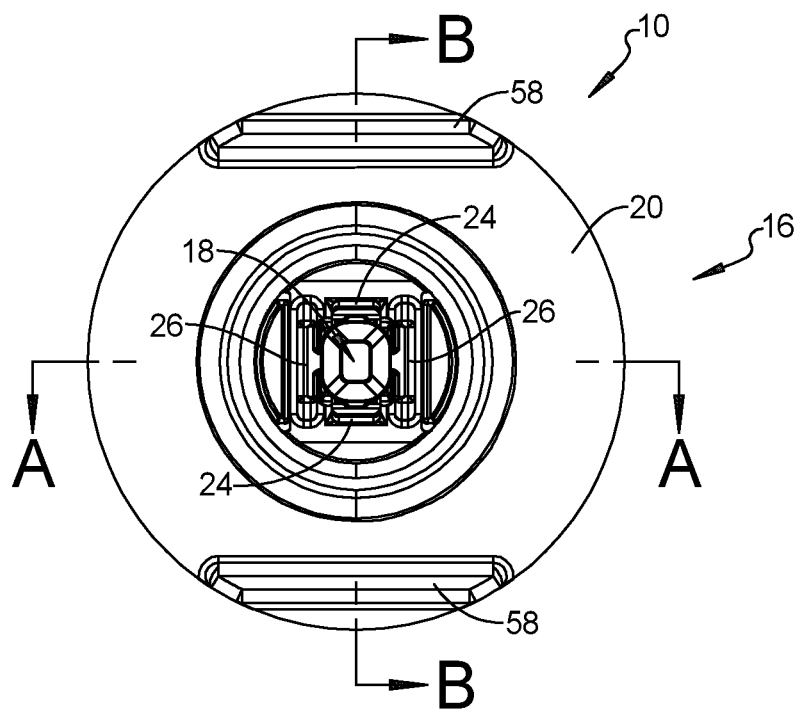
FIG. 4 is a top view of the pin and grommet fastener of FIG. 1.

Referring now to FIGS. 1 through 4, a pin and grommet fastener 10 may be used for attaching a vehicle component, such as a bumper spacer, to a vehicle panel 12 (FIG. 6A) having a hole 14. The pin and grommet fastener 10 locks simultaneously with insertion into the panel 12. The pin and grommet fastener 10 includes a grommet 16 and a pin 18. The grommet 16 may be integrated into a bracket and/or the component to be attached to the panel 12. The grommet 16 and the pin 18 may be made of a thermoplastic material such as acetal, nylon, or glass-filled polypropylene.

The grommet 16 includes a base 20 having an elongated opening 22 (FIG. 2), a pair of panel locking fingers 24, and a pair of pin locking fingers 26. The panel and pin locking fingers 24 and 26 project from the base 20 adjacent to the opening 22. The panel locking fingers 24 are spaced apart from one another along a width W (FIG. 5B) of the opening 22. The pin locking fingers 26 are spaced apart from one another along a length L (FIG. 5A) of the opening 22.

The grommet 16 further includes a seal 28 projecting from the base 20 and surrounding the panel and pin locking fingers 24 and 26. The seal 28 may have an umbrella shape as shown. The panel and pin locking fingers 24 and 26 cooperate with one another to define a pin receptacle 30 (FIG. 2) therebetween.

Figure 2:
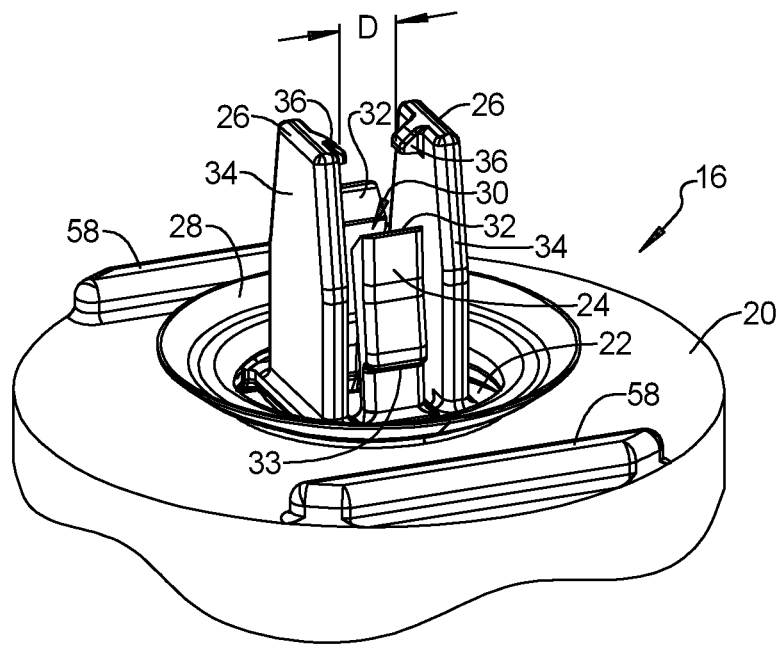
FIG. 2 is a perspective view of the grommet of FIG. 1.

As best shown in FIG. 2, each panel locking finger 24 has a ramped surface 32 and a shoulder 33. Each pin locking finger 26 includes a main body 34 and a ramped protrusion 36 projecting from the main body 34. The ramped protrusions 36 on the pin locking fingers 26 project toward one another.

Figure 3:
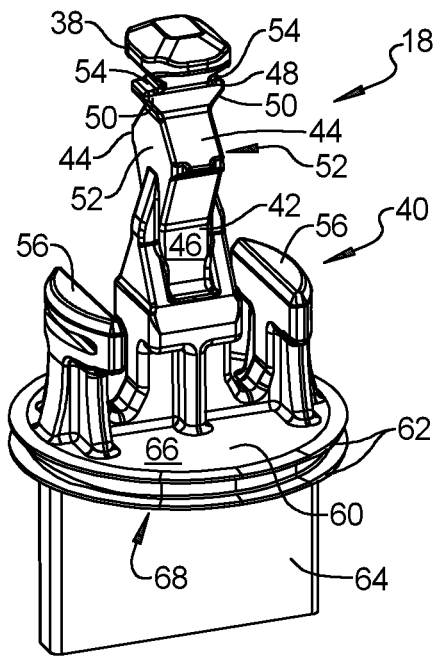
FIG. 3 is a perspective view of the pin of FIG. 1.

As best shown in FIG. 3, the pin 18 includes a pin head 38, a driving beam 40, a pin shaft 42 connecting the pin head 38 to the driving beam 40, a pair of knuckles 44 projecting from opposite side surfaces 46 of the pin shaft 42, and a pin collar 48. The knuckles 44 may be referred to as protrusions. The pin collar 48 includes a pair of wedge portions 50 projecting from opposite side surfaces 52 of the pin shaft 42. The side surfaces 46 of the pin shaft 42 from which the knuckles 44 project are perpendicular to the side surfaces 52 of the pin shaft 42 from which the wedge portions 50 of the pin collar 48 project. The wedge portions 50 of the pin collar 48 cooperate with the pin head 38 to define a pair of locking grooves 54 therebetween. The driving beam 40 includes a pair of half-cylinder portions 56.

In the example shown in FIG. 2, the grommet 16 further includes a pair of ribs 58 projecting from the base 20. In the example shown in FIG. 3, the pin 18 further includes a disk-shaped base 60, a pair of annular lips 62 projecting radially from the base 60, and a holding tab 64. The driving beam 40 and the pin shaft 42 project from a first side 66 of the base 60, and the holding tab 64 projects from a second side 68 of the base 60 opposite of the first side 66.

Figure 5A:
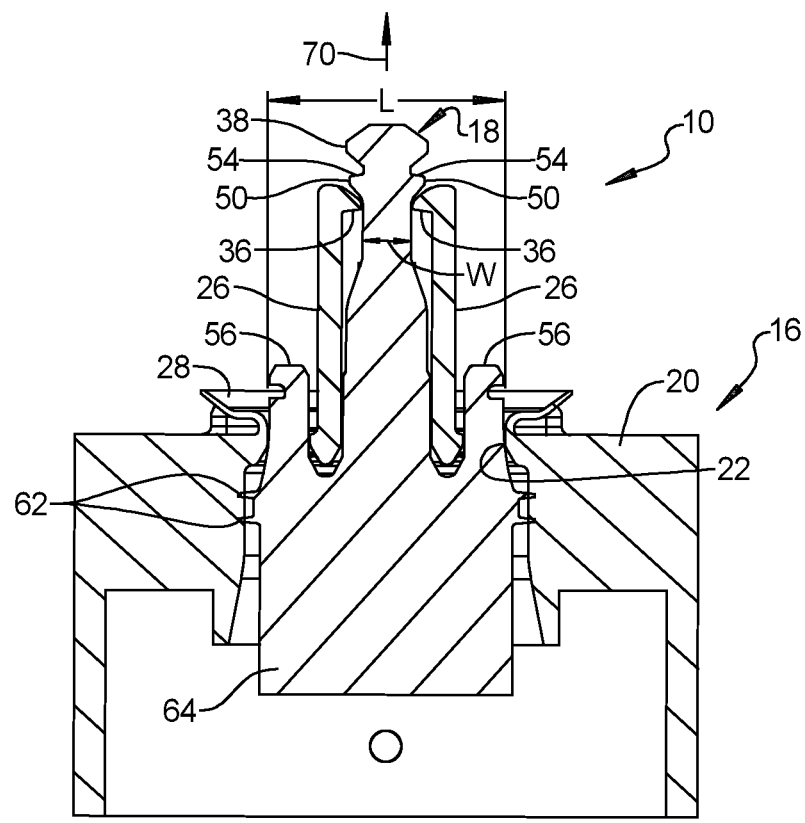
FIG. 5A is a section view of the pin and grommet fastener of FIG. 1 taken along a line A-A shown in FIG. 4, with the fastener shown in a shipping condition.
Figure 5B:
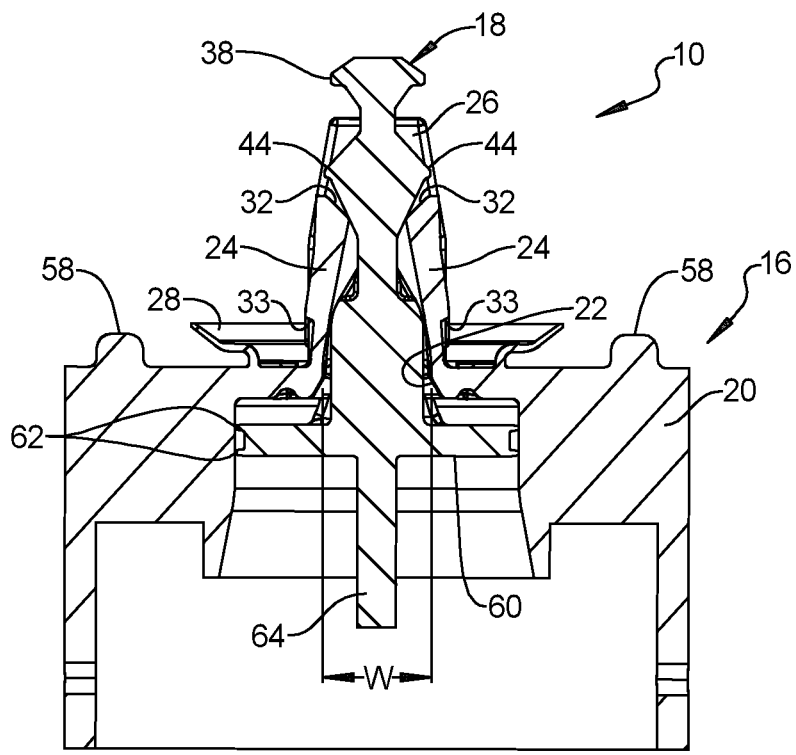
FIG. 5B is a section view of the pin and grommet fastener of FIG. 1 taken along a line B-B shown in FIG. 4, with the fastener shown in the shipping condition.

Referring now to FIGS. 5A and 5B, the pin 18 may be assembled to the grommet 16 (e.g., for shipping) by inserting the pin 18 in a first direction 70 into the opening 22 in the base 20 of the grommet 16 and into the pin receptacle 30 of the grommet 16. As the pin 18 is inserted into the pin receptable 30 (e.g., using the holding tab 64), the knuckles 44 on the pin shaft 42 engage the panel locking fingers 24 and thereby cause the panel locking fingers 24 to flex away from one another. In addition, the pin head 38 and the pin collar 48 engage the ramped protrusions 36 on the pin locking fingers 26 and thereby cause the pin locking fingers 26 to flex away from one another. Furthermore, the annular lips 62 on the pin 18 engage the hole 22 in the base 20 of the grommet 16 to seal the interface between the grommet 16 and the pin 18.

The pin 18 is inserted in the first direction 70 until the knuckles 44 on the pin shaft 42 are moved past the panel locking fingers 24, as shown in FIG. 5B, and the pin head 38 and the pin collar 48 are moved past the ramped protrusions 36 on the pin locking fingers 26, as shown in FIG. 5A. At that point, ramped protrusions 36 on the pin locking fingers 26 engage the pin shaft 42 and thereby retain the pin head 38 in the pin receptacle 30. A distance D between the ramped protrusions 36 when the pin locking fingers 26 are in a relaxed state as shown in FIG. 2 may be less than a width W of the pin shaft 42 (FIG. 5A) so that the pin locking fingers 26 bias the ramped protrusions 36 toward the pin shaft 42 to hold the pin 18 in place relative to the grommet 16.

Figure 6A:
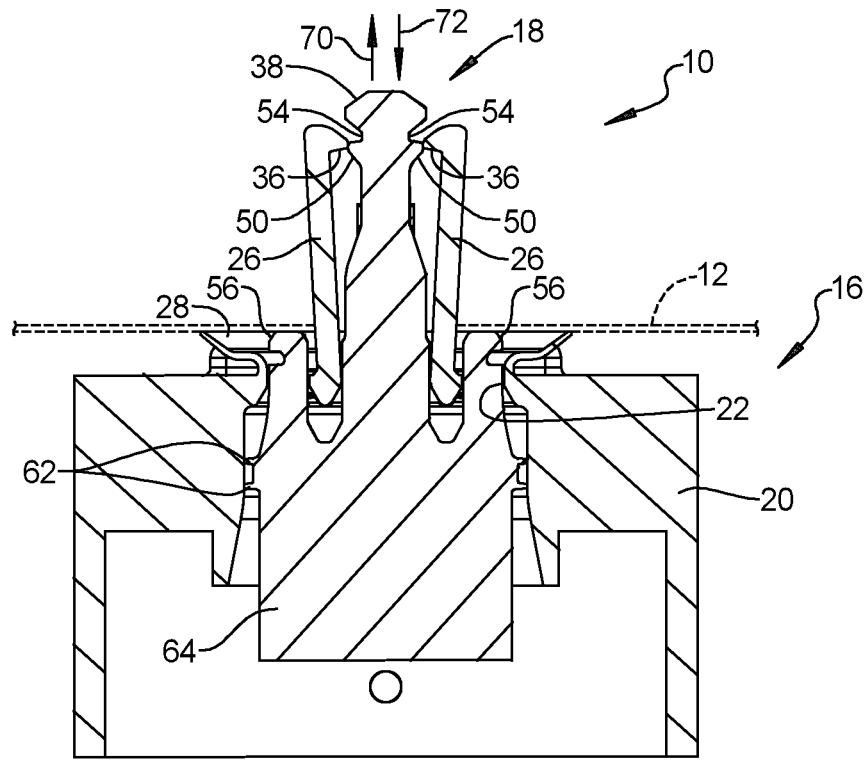
FIG. 6A is a section view of the pin and grommet fastener of FIG. 1 taken along the line A-A of FIG. 4, with the fastener shown in a partially installed condition relative to a hole in a panel.
Figure 6B:
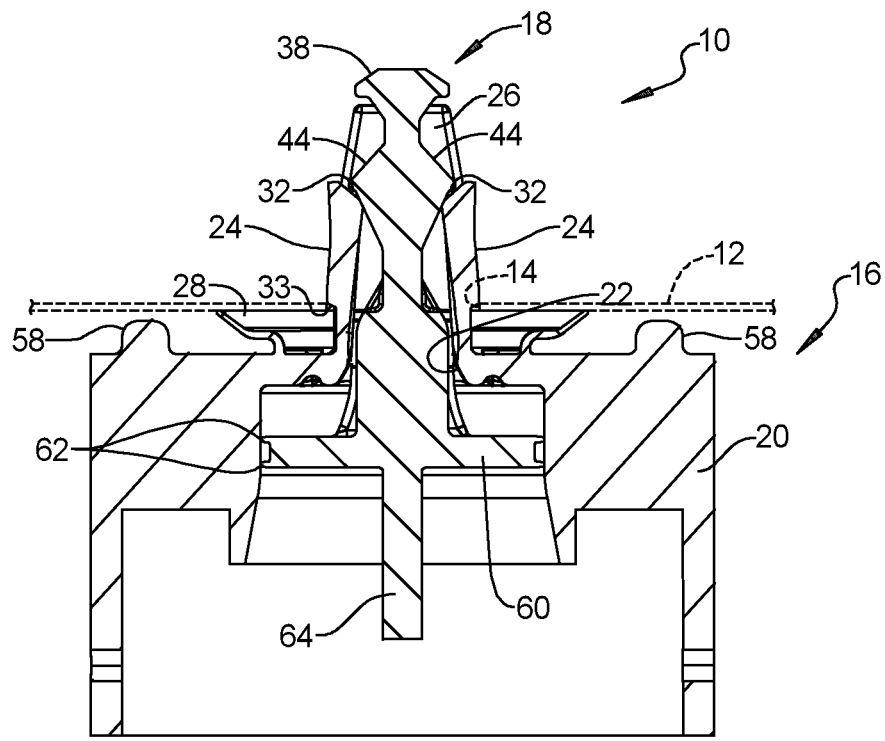
FIG. 6B is a section view of the pin and grommet fastener of FIG. 1 taken along the line B-B of FIG. 4, with the fastener shown in the partially installed condition.

Referring now to FIGS. 6A and 6B, the fastener 10 may be secured to the panel 12 by moving the grommet 16 toward the panel 12 to insert the panel locking fingers 24, the pin locking fingers 26, and the pin head 38 in the first direction 70 into the hole 14 in the panel 12. In turn, the panel 12 engages the driving beam 40 and thereby moves the pin 18 relative to the grommet 16 in a second direction 72 opposite of the first direction 70. As a result, the knuckles 44 on the pin shaft 42 engage the ramped surfaces 32 of the panel locking fingers 24 and thereby force the panel locking fingers 24 to flex away from one another, as shown in FIG. 6B. In addition, the wedge portions 50 of the pin collar 48 begin to move past the ramped protrusions 36 on the pin locking fingers 26, as shown in FIG. 6A.

Figure 7A:
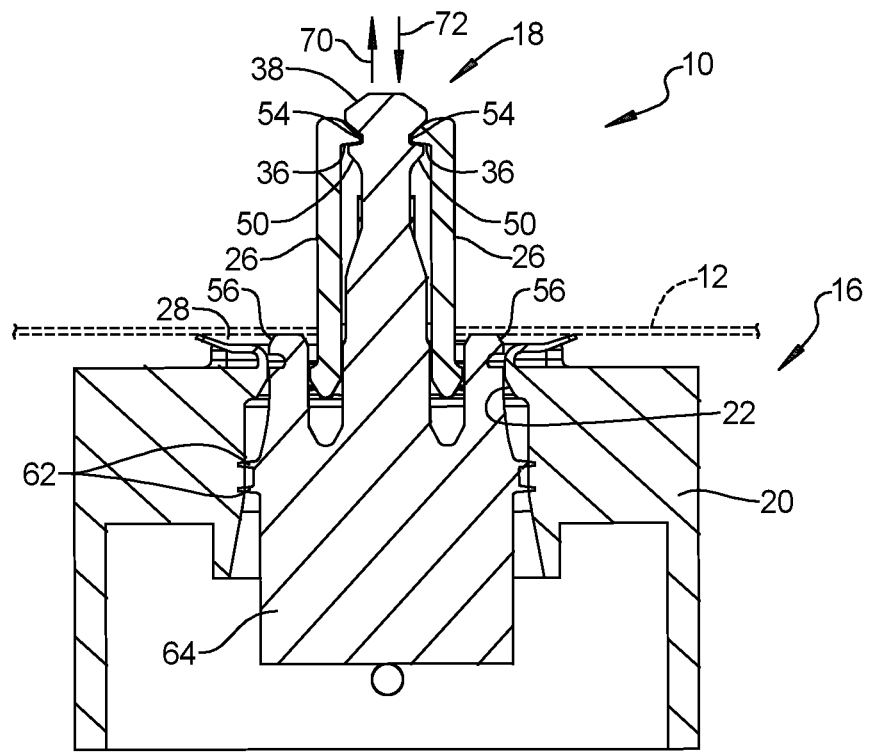
FIG. 7A is a section view of the pin and grommet fastener of FIG. 1 taken along the line A-A of FIG. 4, with the fastener shown in a fully installed condition relative to the hole in the panel.
Figure 7B:
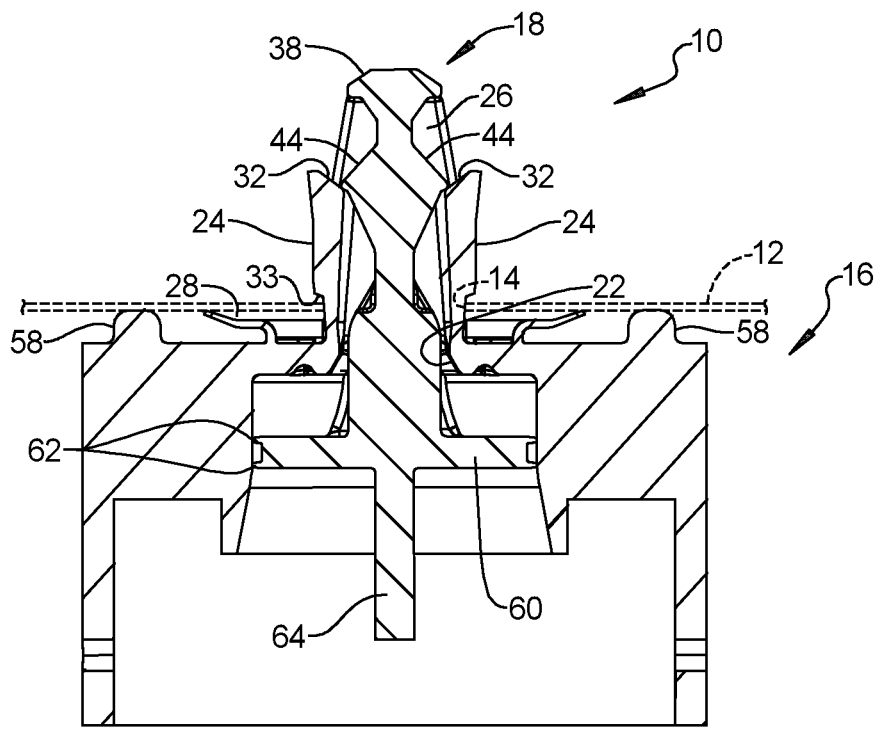
FIG. 7B is a section view of the pin and grommet fastener of FIG. 1 taken along the line B-B of FIG. 4, with the fastener shown in the fully installed condition.
Figure 8:
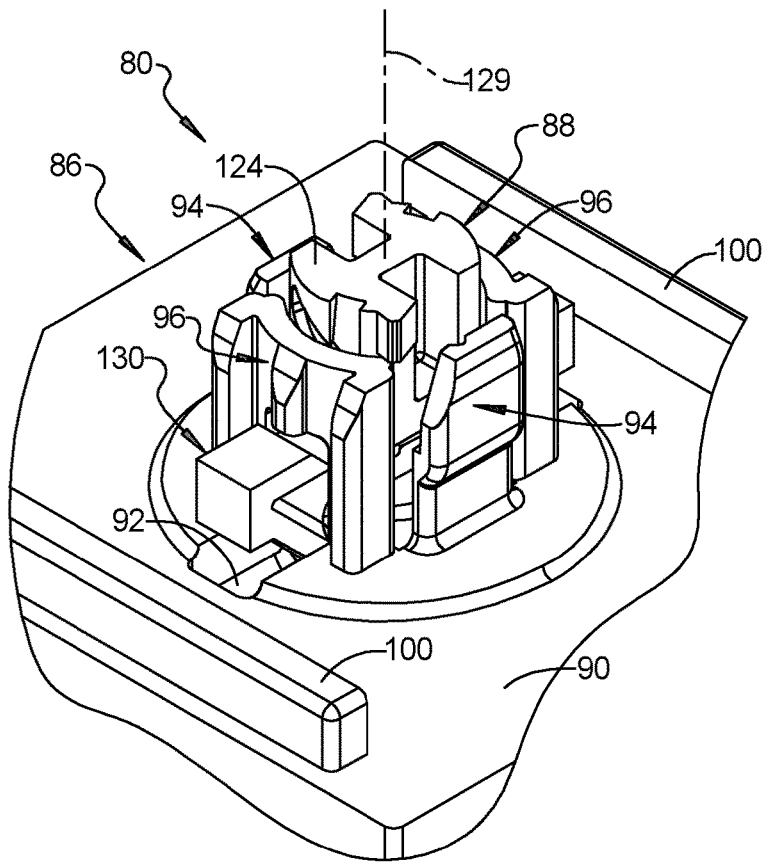
FIG. 8 is a perspective view of another example of a pin and grommet fastener according to the present disclosure, the fastener including a pin and a grommet.

Referring now to FIGS. 7A and 7B, the grommet 16 is moved toward the panel 12 until the ribs 58 on the grommet 16 engage the panel 12. At that point, the ramped protrusions 36 on the pin locking fingers 26 engage the locking grooves 54, as shown in FIG. 7A, and thereby hold the pin 18 in a position in which the knuckles 44 keep forcing the panel locking fingers 24 to flex apart, as shown in FIG. 7B. This inhibits withdrawal of the fastener 10 from the hole 14 in the panel 12. In addition, the shoulders 33 on the panel locking fingers 24 engage the portion of the panel 12 surrounding the hole 14, which further inhibits withdrawal of the fastener 10 from the hole 14. Furthermore, the seal 28 is pressed against the panel 12, which seals the interface between the panel 12 and the grommet 16 surrounding the hole 14. Thus, the presence of the seal 28 avoids the need for an external seal (i.e., an additional part). Moreover, the presence of the pin locking fingers 26 improves the shear and peel performance of the fastener 10.

Referring now to FIGS. 8 through 15, a pin and grommet fastener 80 may also be used for attaching a vehicle component, such as a bumper spacer, to a vehicle panel 82 (FIG. 17) having a hole 84. The pin and grommet fastener 80 includes a grommet 86 and a pin 88. The grommet 86 may be integrated into a bracket and/or the component to be attached to the panel 82. The grommet 86 and the pin 88 may be made of a thermoplastic material such as acetal, nylon, or glass-filled polypropylene.

As best shown in FIGS. 11 through 14, the grommet 86 includes a base 90 having an elongated opening 92, a pair of panel locking fingers 94, and a pair of pin locking fingers 96. The panel and pin locking fingers 94 and 96 project from the base 90 adjacent to the opening 92. The panel locking fingers 94 are spaced apart from one another along a width W of the opening 92. The pin locking fingers 96 are spaced apart from one another along a length L of the opening 92. The panel and pin locking fingers 94 and 96 cooperate with one another to define a pin receptacle 98 therebetween. The grommet 86 further includes a pair of ribs 100 projecting from the base 90.

Each panel locking finger 94 has a first side surface 102 and a second side surface 104 opposite of the first side surface 102. The first side surface 102 of each panel locking finger 94 defines a locking groove 106 and a lead-in chamfer 108 therein. The second side surface 104 of each panel locking finger 94 defines a shoulder 110. The first and second side surfaces 102 and 104 are planar.

Each pin locking finger 96 has a first side surface 112, a second side surface 114 opposite of the first side surface 112, an axial end surface 116, and a rectangular slot 118 (FIG. 13) extending through the first and second side surfaces 112 and 114. In addition, each pin locking finger 96 includes a boss 120 that projects from the first side surface 112 thereof, and ribs 122 that project from the second side surface 114 thereof. The first and second side surfaces 112 and 114 are curved. In the example shown, the bosses 120 are cylindrical. However, the bosses 120 may have other shapes.

Figure 9:
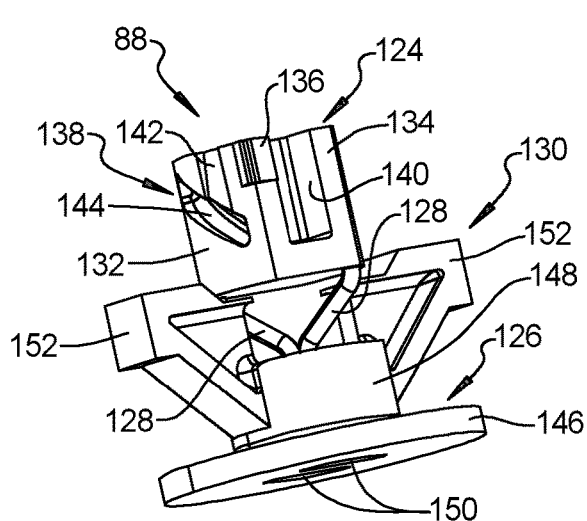
FIGS. 9 and 10 are perspective views of the pin of FIG. 8.
Figure 10:
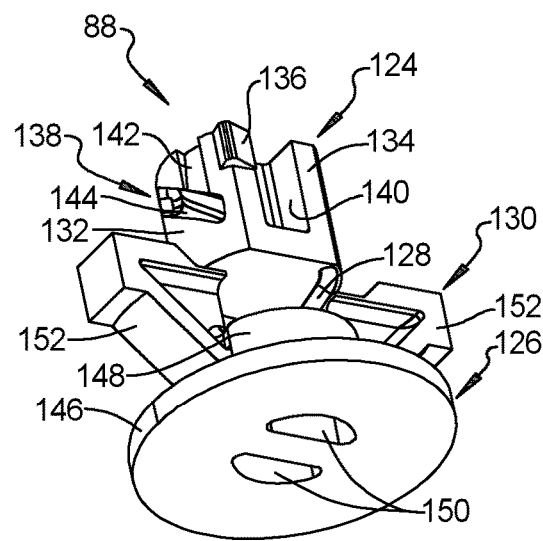
Figure 11:
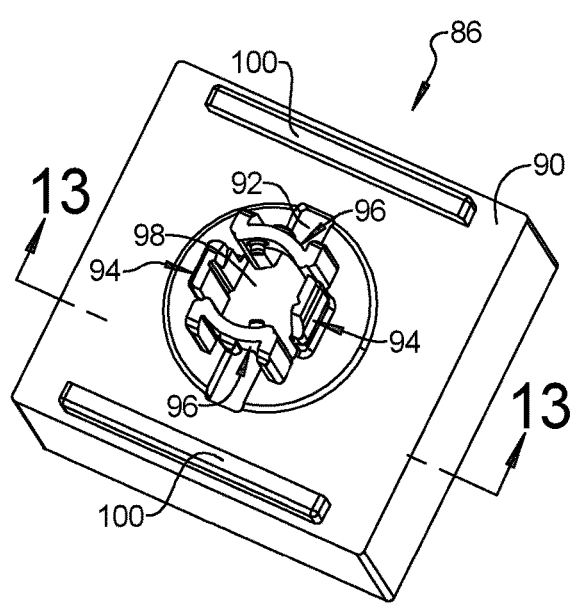
FIG. 11 is a perspective view of the grommet of FIG. 8.
Figure 12:
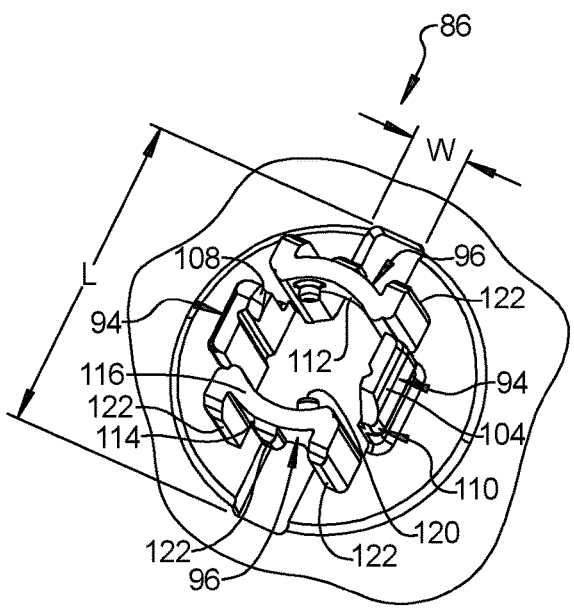
FIG. 12 is an enlarged perspective view of a portion of the grommet of FIG. 8.
Figure 13:
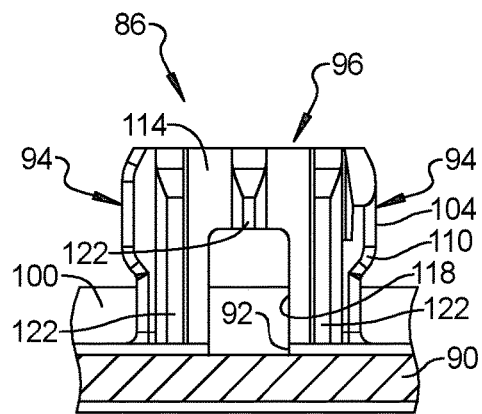
FIG. 13 is a section view of a portion of the grommet of FIG. 8 taken along a line 13-13 shown in FIG. 11.

As best shown in FIGS. 9 and 10, the pin 88 includes a pin head 124, a pin base 126, a pair of tethers 128 that connect the pin head 124 to the pin base 126 while allowing the pin head 124 to rotate about its longitudinal axis 129 (FIG. 8), and a driving beam 130 that projects from the pin base 126. The pin head 124, the pin base 126, the tethers 128, and the driving beam 130 form a single continuous piece. The driving beam 130 is not directly connected to the pin head 124. Rather, the pin base 126 and the tethers 128 connect the driving beam 130 to the pin head 124.

Figure 14:
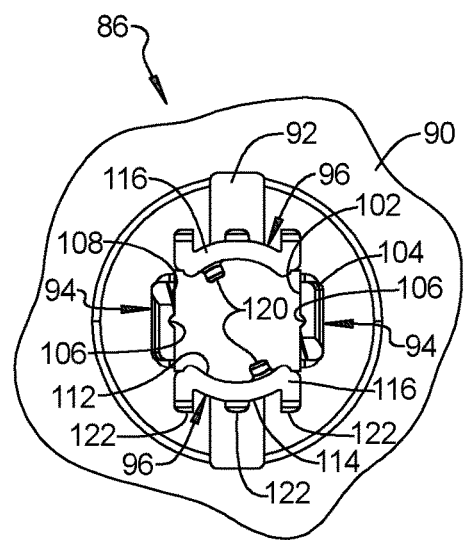
FIG. 14 is a top view of a portion of the grommet of FIG. 8.

The pin head 124 has a pair of first side surfaces 132, a pair of second side surfaces 134, a pair of locking protrusions 136, a pair of guide grooves 138 defined in the first side surfaces 132, and a pair of rectangular pockets 140 defined in the second side surfaces 134. The first side surfaces 132 are curved and are opposite one another. The radius of curvature of the first side surfaces 132 of the pin head 124 may be equal to the radius of curvature of the first and second side surfaces 112 and 114 of the pin locking fingers 96 (FIG. 14). The second side surfaces 134 are planar and are opposite one another.

The locking protrusions 136 project from opposite corners of the pin head 124 at intersections between the first and second side surfaces 132 and 134. Each guide groove 138 includes an axial section 142 that extends along the longitudinal axis 129 and an angled section 144 oriented at an acute angle relative to the axial section 142. The depth of the angled section 144 is greater than the depth of the axial section 142.

The pin base 126 includes a disk-shaped portion 146 and a cylindrical portion 148 projecting from and coaxial with the disk-shaped portion 146. The pin base 126 has a pair of holes 150 that extend through the disk-shaped and cylindrical portion 146 and 148. The holes 150 allow tool access to assemble the pin 88 to the grommet 86. For example, a tool may be inserted through the holes 150 to manipulate the pin head 124 when assembling the pin 88 to the grommet 86. The driving beam 130 includes a pair of triangular blocks 152 that project from the cylindrical portion 148 of the pin base 126.

Figure 15:
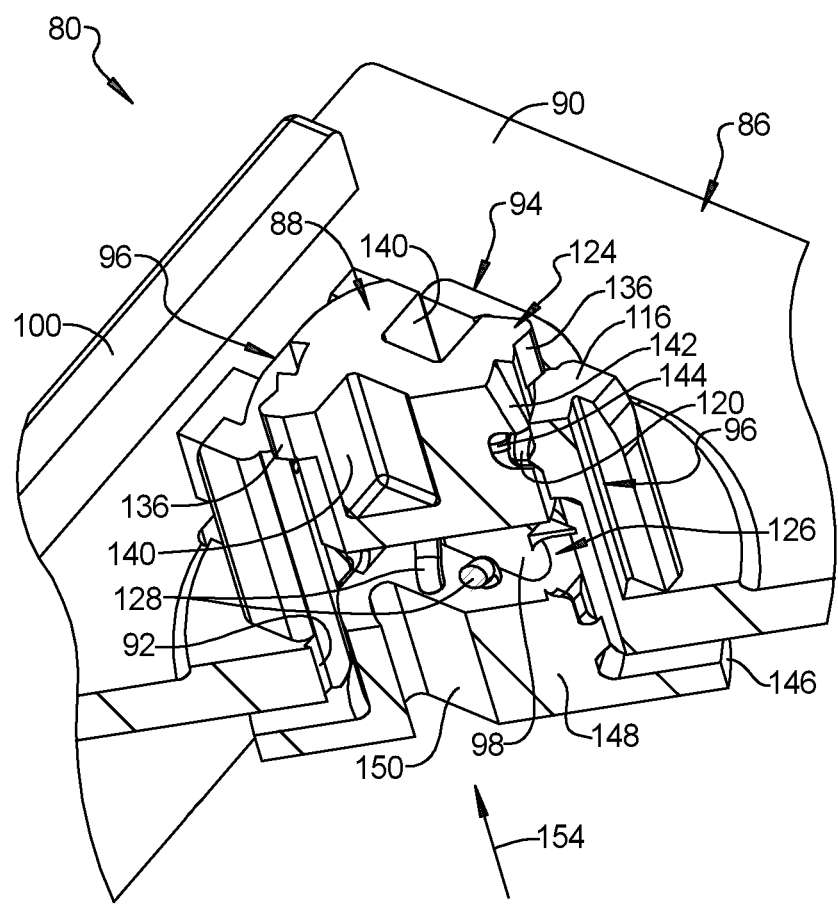
FIG. 15 is a sectioned perspective view of a portion of the pin and grommet fastener of FIG. 8.

As best shown in FIG. 15, the pin 88 is assembled to the grommet 86 by aligning the axial sections 142 of the guide grooves 138 in the pin head 124 with the bosses 120 on the pin locking fingers 96 and inserting the pin head 124 in a first direction 154 into the pin receptacle 98. As the pin head 124 is inserted into the pin receptacle 98, the bosses 120 on the pin locking fingers 96 move through the axial sections 142 of the guide grooves 138. In addition, the locking protrusions 136 on the pin head 124 engage the first side surfaces 112 of the pin locking fingers 96 and thereby cause the pin locking fingers 96 to flex away from one another.

The pin head 124 is inserted into the pin receptacle 98 until the locking protrusions 136 on the pin head 124 move past the pin locking fingers 96. At that point, the pin locking fingers 96 return to their relaxed state, and the axial end surfaces 116 of the pin locking fingers 96 engage the locking protrusions 136 and thereby inhibit withdrawal of the pin head 124 from the pin receptacle 98. In addition, the bosses 120 on the pin locking fingers 96 engage the angled sections 144 of the guide grooves 138 in the pin head 124.

Figure 16:
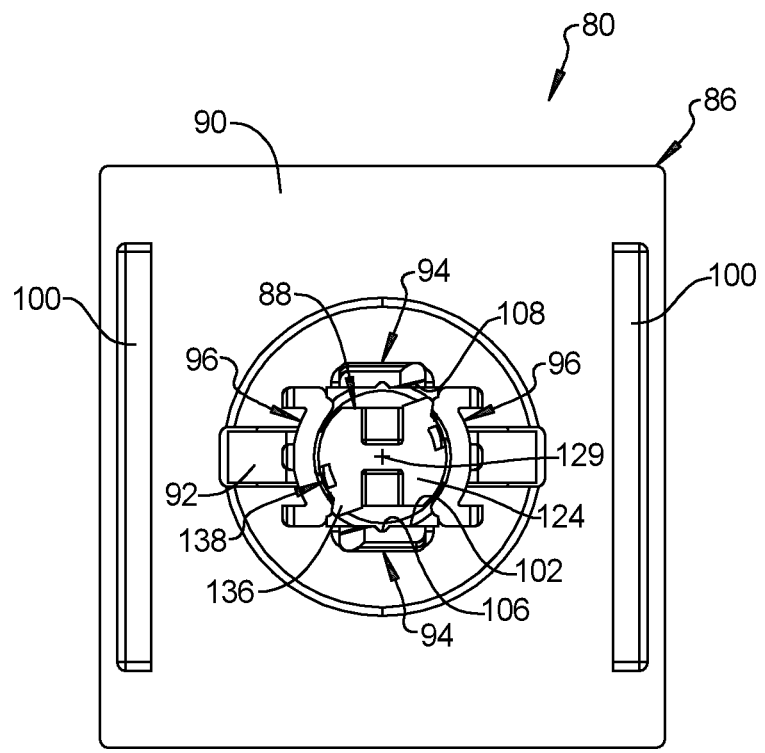
FIG. 16 is a top view of the pin and grommet fastener of FIG. 8 in a shipping condition.
Figure 17:
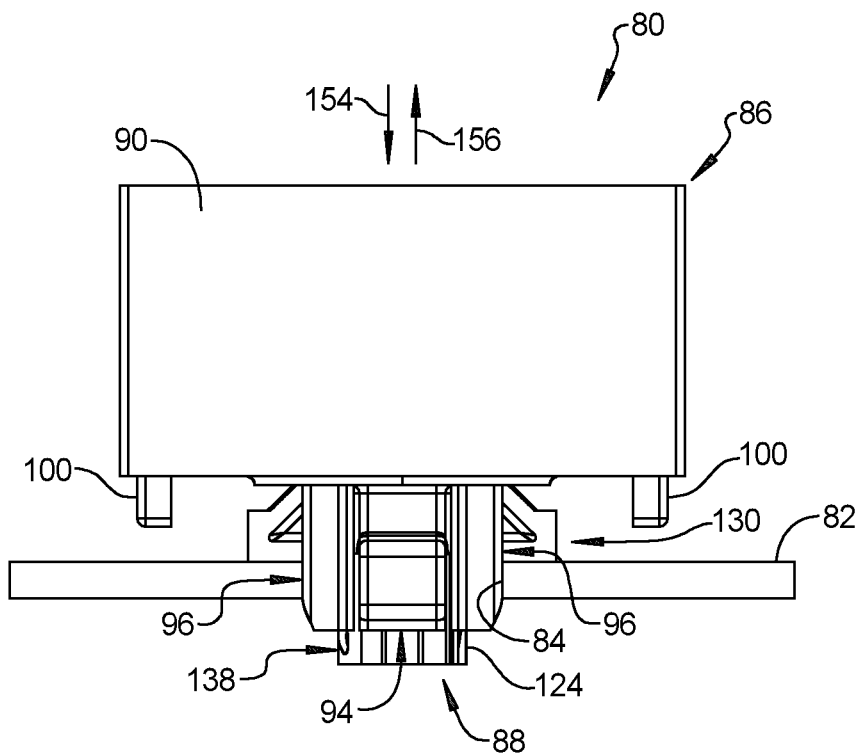
FIG. 17 is a side view of the pin and grommet fastener of FIG. 8 in partially installed condition, with a portion of the fastener inserted into a hole in a panel.

Referring now to FIGS. 16 and 17, to secure the fastener 80 to the panel 82, the pin 88 is assembled to the grommet 86 as discussed above and shown in FIG. 16. The fastener 80 is then moved toward the panel 82 to insert the panel locking fingers 94, the pin locking fingers 96, and the pin head 124 in the first direction 154 into the hole 84 in the panel 82. In turn, the panel 82 engages the driving beam 130 as shown in FIG. 17 and thereby moves the pin 88 relative to the grommet 86 in a second direction 156 opposite of the first direction 154.

Figure 18:
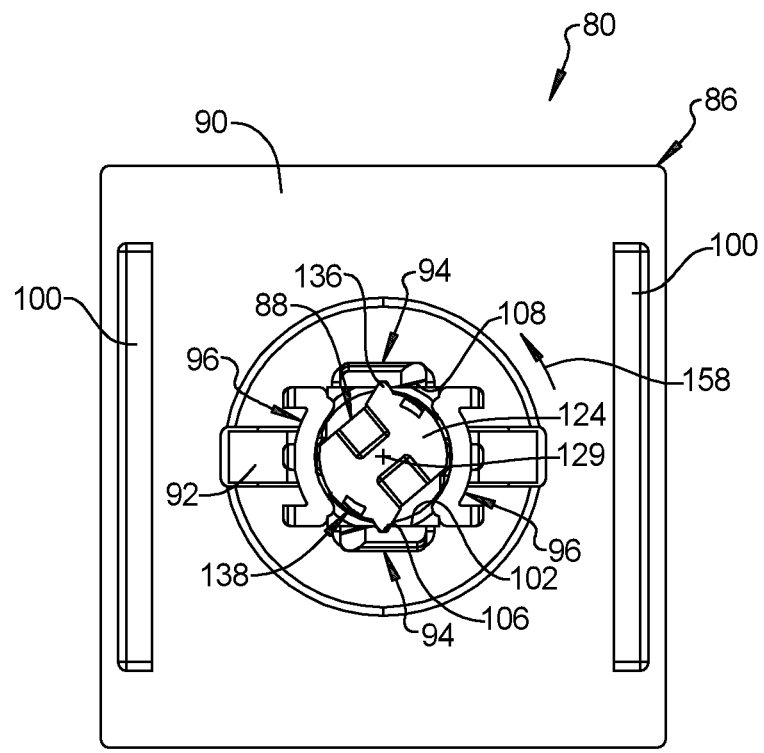
FIG. 18 is a top view of the pin and grommet fastener of FIG. 8 in a fully installed condition relative to the hole in the panel.
Figure 19:
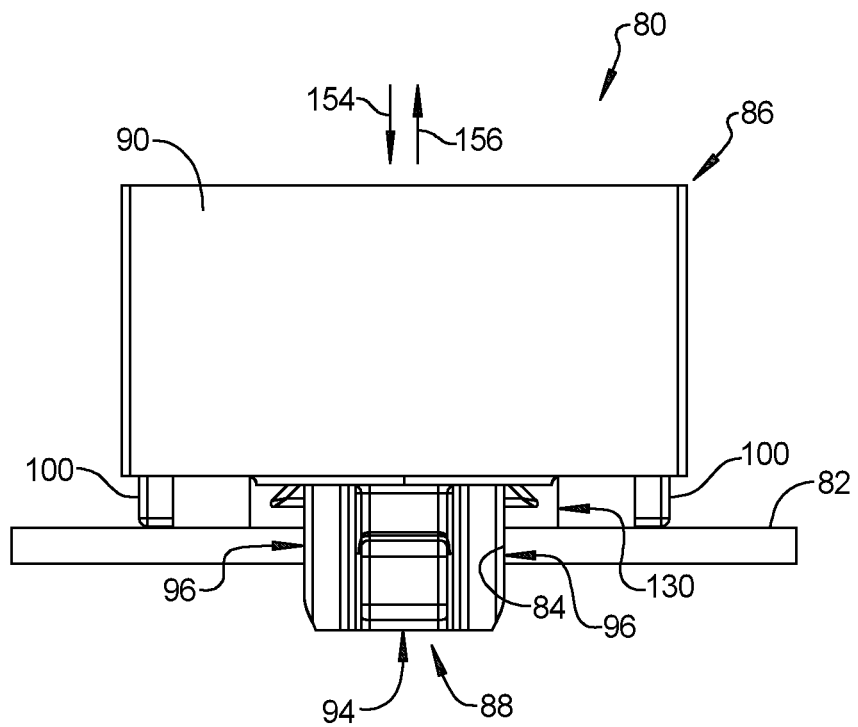
FIG. 19 is a side view of the pin and grommet fastener of FIG. 8 in the fully installed condition relative to the hole in the panel.
Figure 20:
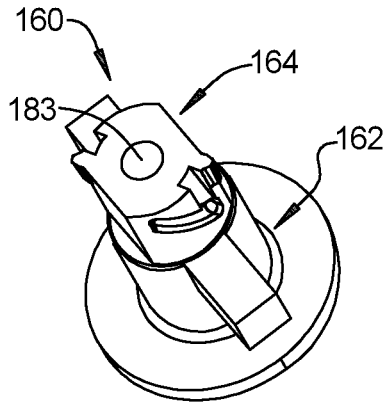
FIG. 20 is a perspective view of an example of a pin that can be used in place of the pin of FIG. 8, the pin including a male part and a female part.

Referring now to FIGS. 15, 18, and 19, as the pin 88 moves relative to the grommet 86 in the second direction 156, the bosses 120 on the pin locking fingers 96 move through the angled sections 144 of the guide grooves 138 and thereby cause the pin head 124 to rotate about its axis 129 in a third direction 158. The bosses 120 move through the angled sections 144 instead of moving back through the axial sections 142 since the depth of the angled sections 144 is greater than the depth of the axial sections 142. As the pin head 124 rotates in the third direction 158, the locking protrusions 136 on the pin head 124 engage the first side surfaces 102 of the panel locking fingers 94 and thereby cause the panel locking fingers 94 to flex away from one another. When this engagement initially occurs, the locking protrusions 136 engage the lead-in chamfer 108 on the first side surfaces 102, which reduces the installation force required.

The fastener 80 is pressed against the panel 82 to rotate the pin head 124 in the third direction 158 until the ribs 100 on the grommet 86 engage the panel 82. At that point, the pin head 124 has been rotated in the third direction 158 by a certain angle (e.g., 45 degrees), and the locking protrusions 136 on the pin head 124 engage the locking grooves 106 in the panel locking fingers 94. This engagement prevents the pin head 124 from rotating and thereby locks the pin head 124 in position relative to the grommet 86. In addition, when the locking protrusions 136 on the pin head 124 engage the locking grooves 106 in the panel locking fingers 94, the panel locking fingers 94 move toward one another, but do not return to their relaxed state. Thus, this engagement locks the pin head 124 in a position in which the locking protrusions 136 keep forcing the panel locking fingers 94 to flex apart and thereby inhibits withdrawal of the fastener 80 from the hole 84 in the panel 82. In addition, the shoulders 110 on the panel locking fingers 24 engage the portion of the panel 82 surrounding the hole 84, which further inhibits withdrawal of the fastener 80 from the hole 84.

Referring now to FIGS. 20 through 25, a pin 160 may be used in place of the pin 88 in the fastener 80. The pin 160 has a longitudinal axis 161 and includes a pin base 162 and a pin body 164. The pin base 162 and the pin body 164 may be made of a thermoplastic material such as acetal, nylon, or glass-filled polypropylene.

The pin base 162 includes a tubular body 166, an annular flange 168, and a driving beam 170. The tubular body 166 has an inner radial surface 172, an outer radial surface 174, a first axial end 175, and a second axial end 176. The inner radial surface 172 of the tubular body 166 defines a hole 177 that extends through the tubular body 166. The annular flange 168 projects radially outward from the outer radial surface 174 of the tubular body 166. The driving beam 170 includes a pair of rectangular blocks 178 that project radially outward from the outer radial surface 174 of the tubular body 166. The first axial end 175 of the tubular body 166 has a recessed surface 179. The second axial end 176 of the tubular body 166 is curved radially inward.

The pin body 164 includes a pin head 180 and a pin shaft 182 projecting from the pin head 180. The pin body 164 has a hole 183 that extends through the pin head 180 and the pin shaft 182. The pin head 180 has a pair of first side surfaces 184, a pair of second side surfaces 186, a pair of locking protrusions 188, a pair of guide grooves 190 defined in the first side surfaces 184, and a plurality of bumps 192. The first side surfaces 184 are curved and are opposite one another. The radius of curvature of the first side surfaces 184 of the pin head 180 may be equal to the radius of curvature of the first and second side surfaces 112 and 114 of the pin locking fingers 96 (FIG. 14). The second side surfaces 186 are planar and are opposite one another.

The locking protrusions 188 project from opposite corners of the pin head 180 at intersections between the first and second side surfaces 184 and 186. Each guide groove 190 includes an axial section 194 that extends along the longitudinal axis 161 and an angled section 196 oriented at an acute angle relative to the axial section 194. The depth of the angled section 196 is greater than the depth of the axial section 194. The pin shaft 182 has legs 198 projecting from an axial end 200 thereof. The legs 198 have locking grooves 202 defined therein.

Figure 21:
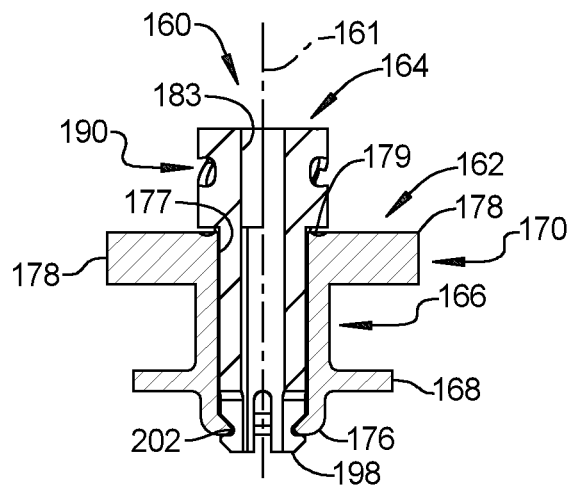
FIG. 21 is a section view of the pin of FIG. 20.
Figure 22:
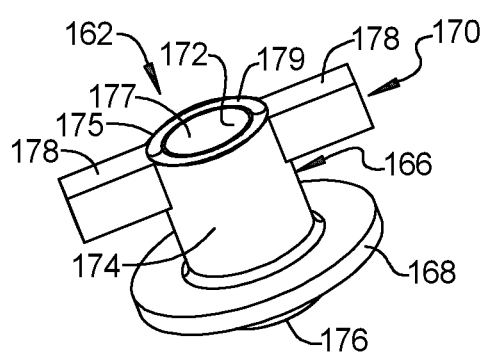
FIG. 22 is a perspective view of the female part of the pin of FIG. 20.
Figure 23:
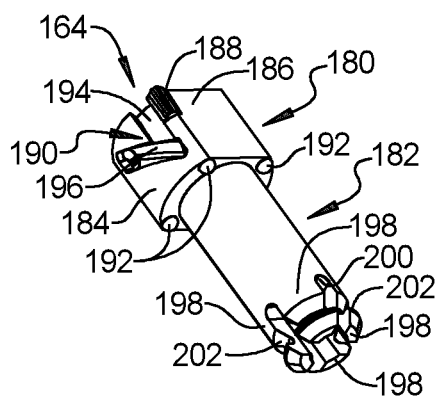
FIG. 23 is a perspective view of the male part of the pin of FIG. 20.
Figure 24:
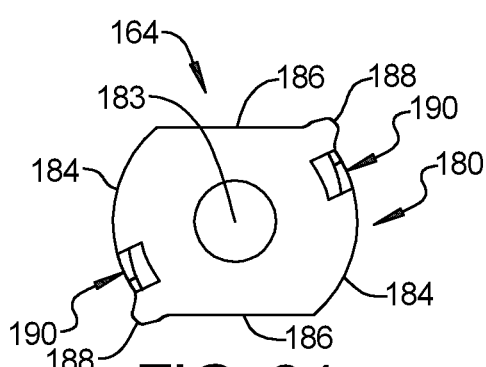
FIG. 24 is a top view of the male part of the pin of FIG. 20.
Figure 25:
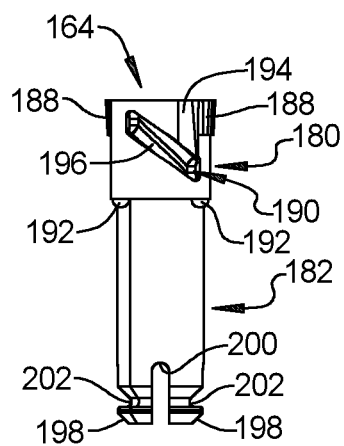
FIG. 25 is a side view of the male part of the pin of FIG. 20.

To assemble the pin body 164 to the pin base 162, the pin shaft 182 is inserted into the hole 177 in the tubular body 166. During the insertion, the second axial end 176 of the tubular body 166 engaged the legs 198 of the pin shaft 192 and thereby cause the legs 198 to flex radially inward toward one another. The pin shaft 182 is inserted into the hole 177 in the tubular body 166 until the bumps 192 on the pin head 180 engage the recessed surface 179 on the first axial end 175 of the tubular body 166, as shown in FIG. 21. At that point, the legs 198 return to their relaxed state, and the second axial end 176 of the tubular body 166 engages the locking grooves 202 in the side surfaces 202 of the legs 198 and thereby secures the pin shaft 182 to the tubular body 166.

The pin body 164 is rotatable relative to the pin base 162 about the longitudinal axis 161 of the pin 160. The recessed surface 179 of the pin base 162 may be smooth to reduce friction as the pin body 164 is rotated relative to the pin base 162. In addition, the bumps 192 on the pin head 180 further reduce friction.

Figure 26:
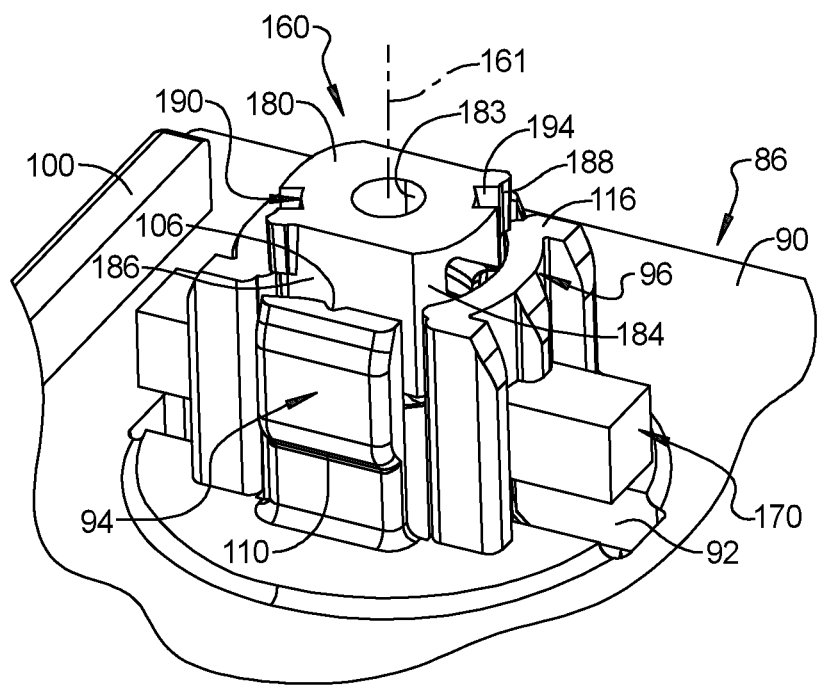
FIG. 26 is a perspective view of a portion of a pin and grommet fastener including the grommet of FIG. 8 and the pin of FIG. 20.
Figure 27:
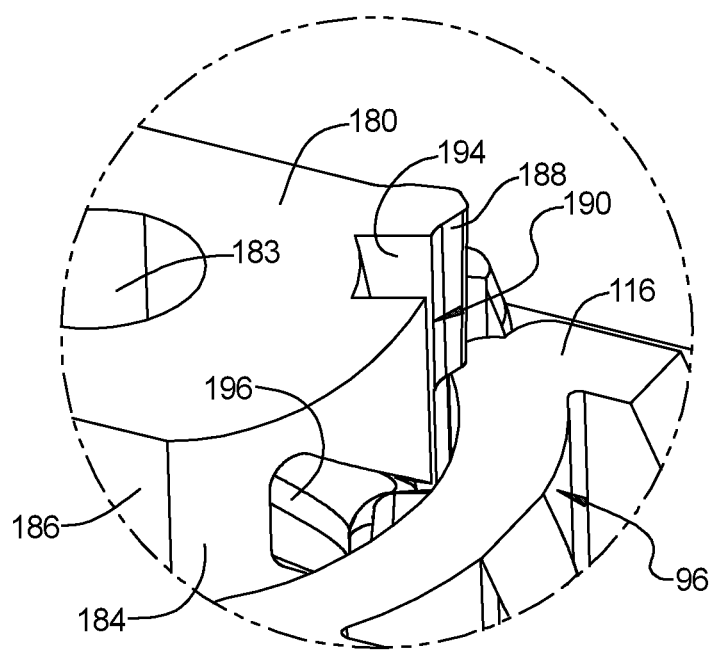
FIG. 27 is an enlarged perspective view of engagement between the grommet of FIG. 8 and the pin of FIG. 20 that inhibits withdrawal of the pin from the grommet.

Referring now to FIGS. 26 and 27, the pin 160 is shown assembled to the grommet 86. The pin 160 is assembled to the grommet 86 in the same way that the pin 88 is assembled to the grommet 86. In addition, the fastener comprising the pin 160 and the grommet 86 may be secured to a panel in the same way that the fastener 80 is secured to a panel.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements but can also be an indirect relationship where one or more intervening elements are present (either spatially or functionally) between the first and second elements.

Although the terms first, second, third, etc. may be used herein to describe various elements, components, regions, layers and/or sections, these elements, components, regions, layers and/or sections should not be limited by these terms. These terms may be only used to distinguish one element, component, region, layer, or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As used herein, the term "and/or" includes any and all combinations of one or more of the associated listed items. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A pin and grommet fastener configured to be secured to within a hole in a panel, the pin and grommet fastener comprising:
   a grommet including a base having an opening, a pair of panel locking fingers projecting from the base adjacent to the opening, and a pair of pin locking fingers projecting from the base adjacent to the opening, the panel and pin locking fingers cooperating with one another to define a pin receptacle therebetween; and
   a pin including a pin head, a driving beam connected to the pin head, and a pair of protrusions, wherein the pin head is configured to be inserted through the opening in the base of the grommet and into the pin receptacle of the grommet, yielding a shipping condition in which the pin locking fingers engage the pin and thereby retain the pin head in the pin receptacle, and the panel locking fingers, the pin locking fingers, and the pin head are configured to be inserted in a first direction into the hole in the panel, yielding a partially installed condition in which the panel engages the driving beam and thereby moves the pin relative to the grommet in a second direction opposite of the first direction, which causes the protrusions on the pin to engage the panel locking fingers and thereby force the panel locking fingers to flex away from one another and inhibit withdrawal of the fastener from the hole in the panel.

2. The pin and grommet fastener of claim 1 wherein the opening in the base of the grommet is elongated, the panel locking fingers are spaced apart from one another along a width of the opening, and the pin locking fingers are spaced apart from one another along a length of the opening.

3. The pin and grommet fastener of claim 1 wherein when the protrusions on the pin engage the panel locking fingers and thereby force the panel locking fingers to flex apart, the pin locking fingers engage the pin head and thereby hold the pin in a position in which the protrusions keep forcing the panel locking fingers to flex apart.

4. The pin and grommet fastener of claim 1 wherein the pin further includes a pin shaft connecting the pin head to the driving beam, and the protrusions on the pin are knuckles that project from the pin shaft.

5. The pin and grommet fastener of claim 4 wherein the pin further includes a pin collar that projects from the pin shaft and cooperates with the pin head to define a pair of locking grooves, and the pin locking fingers include a pair of protrusions configured to engage the locking grooves on the pin to retain the pin head in the pin receptacle.

6. The pin and grommet fastener of claim 5 wherein when the pin is inserted into the pin receptacle of the grommet, and the pin head and the pin collar are moved past the protrusions on the pin locking fingers, the protrusions on the pin locking fingers engage the pin shaft and thereby retain the pin head in the pin receptacle.

7. The pin and grommet fastener of claim 1 wherein side surfaces of the pin head define a guide groove, and the pin locking fingers include a boss that engages the guide groove when the pin head is within the pin receptacle such that, when the pin moves relative to the grommet in the second direction due to the engagement between the driving beam and the panel, the engagement between the boss and the guide groove causes the pin head to rotate about its axis relative to the driving beam.

8. The pin and grommet fastener of claim 7 wherein the protrusions project from the side surfaces of the pin head and engage side surfaces of the panel locking fingers, and thereby cause the panel locking fingers to flex apart, when the pin head rotates due to movement of the pin in the second direction and the engagement between the boss and the guide groove.

9. The pin and grommet fastener of claim 8 wherein when the pin head is inserted into the pin receptacle and the protrusions on the pin head are moved past the pin locking fingers, axial end surfaces of the pin locking fingers engage the protrusions and thereby inhibit withdrawal of the pin head from the pin receptacle.

10. The pin and grommet fastener of claim 8 wherein the panel locking fingers define locking grooves and the protrusions on the pin head engage the locking grooves in the panel locking fingers when the pin head has been rotated by a first amount, the engagement between the protrusions and the locking grooves preventing the pin head from rotating and thereby locking the pin head in position relative to the grommet.

11. The pin and grommet fastener of claim 10 wherein the locking grooves are defined in a first side surface of the pin locking fingers, the panel locking fingers further include an overhang that projects from a second side surface thereof opposite of the first side surface and, when the panel locking fingers are inserted through the hole in the panel, the overhang on the panel locking fingers engages a backside of the panel and thereby further inhibits withdrawal of the fastener from the hole in the panel.

12. The pin and grommet fastener of claim 1 further comprising a tether that connects the pin head to the driving beam while allowing the pin head to rotate about its axis.

13. The pin and grommet fastener of claim 1 further comprising a tubular body having an outer radial surface from which the driving beam projects, wherein the pin further includes a pin shaft projecting from the pin head and configured to be secured within the tubular body through a snap fit to connect the pin head to the driving beam.

14. The pin and grommet fastener of claim 13 wherein the pin shaft has legs projecting from an axial end thereof, the legs having side surfaces that define grooves therein, the tubular body having an annular flange projecting radially outward therefrom, the annular flange engaging the grooves in the legs and thereby securing the pin shaft to the tubular body when the pin shaft is inserted into the tubular body.

15. A pin and grommet fastener configured to be secured to within a hole in a panel, the pin and grommet fastener comprising:
a grommet including a base having an opening, a pair of panel locking fingers projecting from the base adjacent to the opening, and a pair of pin locking fingers projecting from the base adjacent to the opening, the panel and pin locking fingers cooperating with one another to define a pin receptacle therebetween, the pin locking fingers including protrusions that project toward one another; and
a pin including a pin head, a driving beam, a pin shaft connecting the pin head to the driving beam, knuckles projecting from opposite side surfaces of the pin shaft, and a pin collar projecting from opposite side surfaces of the pin shaft and cooperating with the pin head to define a pair of locking grooves, wherein the pin head and the pin shaft are configured to be inserted through the opening in the base of the grommet and into the pin receptacle of the grommet, yielding a shipping condition in which the protrusions on the pin locking fingers engage the pin shaft and thereby retain the pin head in the pin receptacle, and the panel locking fingers, the pin locking fingers, and the pin head are configured to be inserted in a first direction into the hole in the panel, resulting a partially installed condition in which the panel engages the driving beam and thereby moves the pin relative to the grommet in a second direction opposite of the first direction, which causes the knuckles on the pin shaft to engage the panel locking fingers and thereby forces the panel locking fingers to flex away from one another, and the pin collar is configured to be moved in the second direction past the protrusions on the pin locking fingers, yielding a fully installed condition in which the protrusions engage the locking grooves in the pin and thereby hold the pin in a position in which the knuckles keep forcing the panel locking fingers to flex apart, which inhibits withdrawal of the fastener from the hole in the panel.

16. The pin and grommet fastener of claim 15 wherein the opening in the base of the grommet is elongated, the panel locking fingers are spaced apart from one another along a width of the opening, the pin locking fingers are spaced apart from one another along a length of the opening, and the side surfaces of the pin shaft from which the knuckles project are perpendicular to the side surfaces of the pin shaft from which the pin collar projects.

17. The pin and grommet fastener of claim 15 wherein the grommet further includes a seal projecting from the base, surrounding the panel and pin locking fingers, and configured to press against the panel when the panel locking fingers, the pin locking fingers, and the pin head are inserted into the hole in the panel and the protrusions on the pin locking fingers engage the locking grooves in the pin.

18. A pin and grommet fastener configured to be secured to within a hole in a panel, the pin and grommet fastener comprising:
a grommet including a base, a pair of panel locking fingers projecting from the base, and a pair of pin locking fingers projecting from the base, the panel and pin locking fingers cooperating with one another to define a pin receptacle therebetween, the panel locking fingers having side surfaces that define locking grooves therein, the pin locking fingers including a boss that projects from a side surface thereof; and
a pin including a pin head and a driving beam connected to the pin head, the pin head including protrusions that project from side surfaces thereof, the side surfaces of the pin head defining a guide groove, wherein the pin head is configured to be inserted into the pin receptacle of the grommet such that the protrusions on the pin head are moved past the pin locking fingers, yielding a shipping condition in which axial end surfaces of the pin locking fingers engage the protrusions and thereby inhibit withdrawal of the pin head from the pin receptacle, and the panel locking fingers, the pin locking fingers, and the pin head are configured to be inserted in a first direction into the hole in the panel, yielding a partially installed condition in which the panel engages the driving beam and thereby moves the pin relative to the grommet in a second direction opposite of the first direction and, in turn, the engagement between the boss and the guide groove causes the pin head to rotate about its axis relative to the driving beam, which causes the protrusions on the pin head to engage the panel locking fingers and thereby force the panel locking fingers to flex away from one another, and the pin head is configured to be rotated by a first amount, yielding a fully installed condition in which the protrusions engage the locking grooves, which prevents the pin head from rotating and thereby locks the pin head in position relative to the grommet and inhibits withdrawal of the fastener from the hole in the panel.

19. The pin and grommet fastener of claim 18 further comprising a tether that connects the pin head to the driving beam while allowing the pin head to rotate about its axis, wherein the pin head, the driving beam, and the tether form a single continuous piece.

20. The pin and grommet fastener of claim 18 further comprising a tubular body having an outer radial surface from which the driving beam projects and an axial end that is curved radially inward, wherein the pin further includes a pin shaft projecting from the pin head, the pin shaft having legs projecting from an axial end thereof, the legs having side surfaces that define grooves therein, the axial end of the tubular body engaging the grooves in the legs and thereby securing the pin shaft to the tubular body when the pin shaft is inserted into the tubular body.

* * * * *